United States Patent [19]

Kamada et al.

[11] Patent Number: 5,357,175
[45] Date of Patent: Oct. 18, 1994

[54] DEFLECTION AND HIGH VOLTAGE CIRCUIT

[75] Inventors: Noriyuki Kamada; Masataka Uchida, both of Tokyo, Japan

[73] Assignee: Pioneer Electronic Corporation, Tokyo, Japan

[21] Appl. No.: 30,873

[22] Filed: Mar. 12, 1993

[30] Foreign Application Priority Data

Apr. 10, 1992 [JP] Japan .................................. 4-091014

[51] Int. Cl.$^5$ ............................................ H01J 29/70
[52] U.S. Cl. .................................... 315/411; 315/408; 315/371; 363/21
[58] Field of Search ...................... 315/408, 371, 411; 358/243, 190; 363/21

[56] References Cited

U.S. PATENT DOCUMENTS

| | | | |
|---|---|---|---|
| 4,814,672 | 3/1989 | Dieterle et al. | 315/411 |
| 4,900,988 | 2/1990 | Yuk | 315/411 |
| 5,016,156 | 5/1991 | Ogawa | 363/21 |
| 5,059,874 | 10/1991 | Oliver | 315/411 |

Primary Examiner—Theodore M. Blum
Attorney, Agent, or Firm—Sughrue, Mion, Zinn, Macpeak & Seas

[57] ABSTRACT

A deflection and high voltage circuit produces a proper luminance level and a focusing performance in a CRT image irrespectively of changes in a luminance signal level. The circuit is provided with a voltage control circuit for controlling an output voltage level of a voltage supply circuit according to changes in the anode voltage of the CRT so that a voltage obtained by rectifying a voltage generated by the secondary winding of flyback transformer, i.e., the anode voltage of the CRT is made constant. Furthermore, the circuit is provided with a correction circuit for preventing a voltage across the terminals of a S-curve correction capacitor determining the H-size of the CRT image from being affected by the variation of the output voltage level of the voltage supply circuit.

11 Claims, 3 Drawing Sheets

DEFLECTION AND HIGH VOLTAGE CIRCUIT

BACKGROUND OF THE INVENTION

1. Field of the Invention

The present invention generally relates to a deflection and high voltage circuit for a Cathode-Ray Tube (hereinafter, referred to as CRT), and more specifically to a deflection and high voltage circuit for display systems using CRT(s), for deflection and generation of a high tension anode voltage for the CRT.

2. Description of Background Information

Display devices including a CRT or CRTs, such as television systems, projection type television systems, etc., generally have such a structure that a deflection current is supplied to a horizontal yoke coil of the CRT, and a high voltage to be connected to the anode of the CRT is generated.

An example of conventional deflection and high voltage circuit is shown in FIG. 1. As shown, the circuit is constructed such that a horizontal driving signal is supplied to the base of a horizontal power transistor 1. First and second parallel circuits 2 and 3 forming a series circuit are connected between the collector and the emitter, which is grounded, of the horizontal power transistor 1. The first parallel circuit 2 is constituted by a damper diode 11, a damper capacitor 12 of a deflection retrace capacitor, a horizontal deflection winding 13, and an AC coupling capacitor 14 called S-curve correction capacitor. Similarly, the second parallel circuit 3 is constituted by a damper diode 16, a modulation retrace capacitor 17, a modulator inductor 18, and a modulator capacitor 19.

A junction between the modulator inductor 18 and the modulator capacitor 19 is connected, via a resistor 21, to the collector of a transistor 22 whose emitter is grounded and a horizontal amplitude correction circuit 9 is connected to the base of the transistor 22.

The primary (primary winding) of a flyback transformer 5 is connected, at its one end, to a line to which the collector of the horizontal output transistor 1 is connected, and a voltage supply circuit 6 is connected to the other end of the primary of the flyback transformer 5. The voltage supply circuit 6 has a series connection type constant voltage circuit for providing a power voltage +B, constituted by a transistor 23, a Zener diode 24 and a resistor 25. The output voltage of the series-connection type constant voltage circuit is connected via a resistor 27 and a diode 28 connected to the resistor 27 at its anode, through which the voltage flows in the normal direction, to the other end of the primary 5a. The output voltage appearing at the secondary winding of the flyback transformer 5 is rectified by a rectifying diode 7 and in turn supplied to the anode of the CRT (not shown).

A bleeder resistor 8 is connected, as a voltage dividing resistor, to the cathode of the diode 7. The output of the bleeder resistor 8 is connected to the horizontal amplitude correction circuit 9 including a buffer amplifier 30, and an inverting amplifier 31. A variable resistor 33 to adjust the horizontal size is connected, via a resistor 32, to the junction between the buffer amplifier 30 and the inverting amplifier 33, and a parabolic voltage Vp repeated at every field is connected via a resistor 34 for the purpose of the compensation of the pincushion distortion.

In the circuit structured as described above, the power voltage +B is produced as a DC voltage appearing at the emitter of the transistor 23 whose level is determined by the Zener voltage of the Zener diode 24. The power voltage +B produced in this way is supplied to the collector line of the horizontal output transistor 1 through the resistor 27, diode 28 and the primary 5a of the flyback transformer 5. When the horizontal output transistor 1 is switched off, charging of the capacitors 12, 17, 14 and 19 takes place.

When the horizontal output transistor 1 is turned on by the horizontal drive signal at a high level, currents flow from the capacitors 14 and 19 to the deflection winding 13 and the dummy winding 18 respectively, and the magnitude of the currents increases linearly. When the horizontal drive signal is at a low level to turn off the horizontal transistor 1, the electromagnetic energy accumulated in the deflection winding 13 and the dummy winding 18 is released to charge the retrace capacitor 12 and the modulation retrace capacitor 17 so that the voltage level at the terminal of the deflection coil goes up. This voltage is raised by the flyback transformer 5 as a horizontal flyback pulse signal, and the resultant high voltage is supplied, via a rectifying diode 7, to the anode of the CRT.

After the charging of the above-mentioned electromagnetic energy to the resonance capacitors 12 and 17, no current flows through the windings 13 and 18. Subsequently, the electrostatic energy stored in the retrace capacitor 12 and the modulation retrace capacitor 17 is discharged toward the deflection winding 13 and the dummy winding 18, so that a current of an inverse direction flows in the deflection winding 13 and the dummy winding 18. When the discharge of the resonance capacitors 12 and 17 is completed, the energy stored in the windings 13 and 18 is discharged via the damper diodes 11 and 16 respectively, and the charging of the capacitors 14 ad 19 will take place. When the transistor 1 is again switched on, the above-described series of operations repeat, so that the high voltage is produced and a horizontal deflection current of a sawtooth waveform flows through the deflection winding 13 at the same time.

The output voltage of the diode 7 is smoothed out by the capacitance of the anode of the CRT. The voltage applied to the anode of the CRT, which is smoothed out, is then voltage divided by the bleeder resistor 8, and supplied to the base of the transistor 22 via the buffer amplifier 30 and the inverting amplifier 31. Then, the transistor 22 enters into an active state depending on the potential level at the base thereof, and it operates as a variable load to vary the voltage V2 across the terminals of the capacitor 19. Since the parabolic voltage Vp is superimposed on the inverting amplifier 31, the active state of the transistor not only varies in response to the anode voltage, but also varies repetitively at every field period in response to the parabolic voltage Vp.

With this provision, the voltage V2 across the terminals is varied in response to the parabolic voltage Vp, to compensate for the pincushion distortion. The voltage V2 across the terminals is further varied relatively in response to the resistance of the variable resistor 33, so that the adjustment of the horizontal size is performed.

Since no DC voltage is produced across the terminals of the deflection winding 13 and the dummy winding 18 respectively functioning as an inductance, both the voltage V1 across the terminals of the capacitor 14 and the voltage V2 across the terminals of the capacitor 19 become DC voltages whose levels are determined by the impedance of each circuit. The sum V1+V2 of these voltages V1 and V2 is equal to the collector voltage Vc of the transistor 1.

Since the average value of the collector voltage Vc of the transistor 1 is equal to the constant voltage +B1 (the terminal voltage of the primary 5a of the flyback transformer), the collector voltage Vc does not vary at the field frequency. Furthermore, since the sum of the voltages V1 and V2 is equal to the voltage +B, the voltage V1 is rendered to vary at the field frequency in response to the variation of the voltage V2. In this state, the direction of the variation is opposite to that of the variation of the voltage V2.

As described above, if the voltage +B is maintained constant, the collector voltage Vc of the transistor 1 does not vary at the field frequency, so that the voltage applied to the primary 5a of the flyback transformer 5 will have no change at the field frequency. As a result, the deflection current flowing through the deflection winding 13 does not vary at the field frequency because the voltage V1 is maintained constant. The high voltage generated at the secondary winding 5b of the flyback transformer 5 also will not vary at the field frequency.

However, in the case of the conventional deflection and high voltage generation circuit mentioned above, there has been a drawback that fluctuation of the anode voltage is caused by the variation of the luminance signal level, so that the luminance level and the focusing of the CRT image cannot be obtained properly. More specifically, when the luminance signal level is high, it will cause the reduction of the anode voltage, which in turn will result in a broader horizontal size and a larger focus point. For the reason mentioned above, there has been a problem that proper luminance level and focusing performance cannot be obtained with the conventional deflection and high voltage circuit.

OBJECTS AND SUMMARY OF THE INVENTION

An object of the present invention is therefore to provide a deflection and high-voltage circuit by which a proper luminance level of a CRT image display or of the screen of a projection television is always obtained irrespectively of the variation in the luminance signal level.

Another object of the present invention is therefore to provide a deflection and high-voltage circuit by which the horizontal size of the image in a CRT image display or in the screen of a projection television is always maintained constant irrespectively of the variation in the luminance signal level.

A further object of the present invention is therefore to provide a deflection and high-voltage circuit by which a constant horizontal size and a constant high voltage of the anode of a CRT or CRTs are maintained even if the brightness signal level of the part of the entire screen is varied.

According to the present invention, a deflection and high voltage circuit comprises a voltage supply means for generating a DC voltage, a horizontal deflection circuit means, including a switching element which opens and closes in response to a horizontal drive signal, for supplying a current based on an output voltage of the voltage supply means to a horizontal deflection winding when the switching element is opened, a flyback transformer having a primary winding and a secondary winding, a terminal voltage of the horizontal deflection winding being supplied to the primary winding, and a rectifying element rectifying the voltage at the secondary winding of the flyback transformer and supplying an output voltage to the anode of the CRT, wherein the circuit further comprises a voltage control means for controlling the output signal level of the voltage supply means in response to the output voltage level of the rectifying element, and a means for obtaining a constant horizontal size of a display image in response to the variation in the output voltage level of the voltage supply means.

In the deflection and high voltage circuit according to the present invention, the output voltage level of the voltage supply means is controlled in response to the variation of the anode voltage of the CRT, so that a voltage obtained by rectifying the voltage at the secondary winding of the flyback transformer, i.e., the anode voltage of the CRT, is maintained constant, and changes in the horizontal size appearing over several fields is suppressed.

DETAILED DESCRIPTION OF PREFERRED EMBODIMENTS

Embodiments of the deflection and high voltage circuit according to the present invention will be described with reference to FIGS. 2 and 3.

Figure 1:
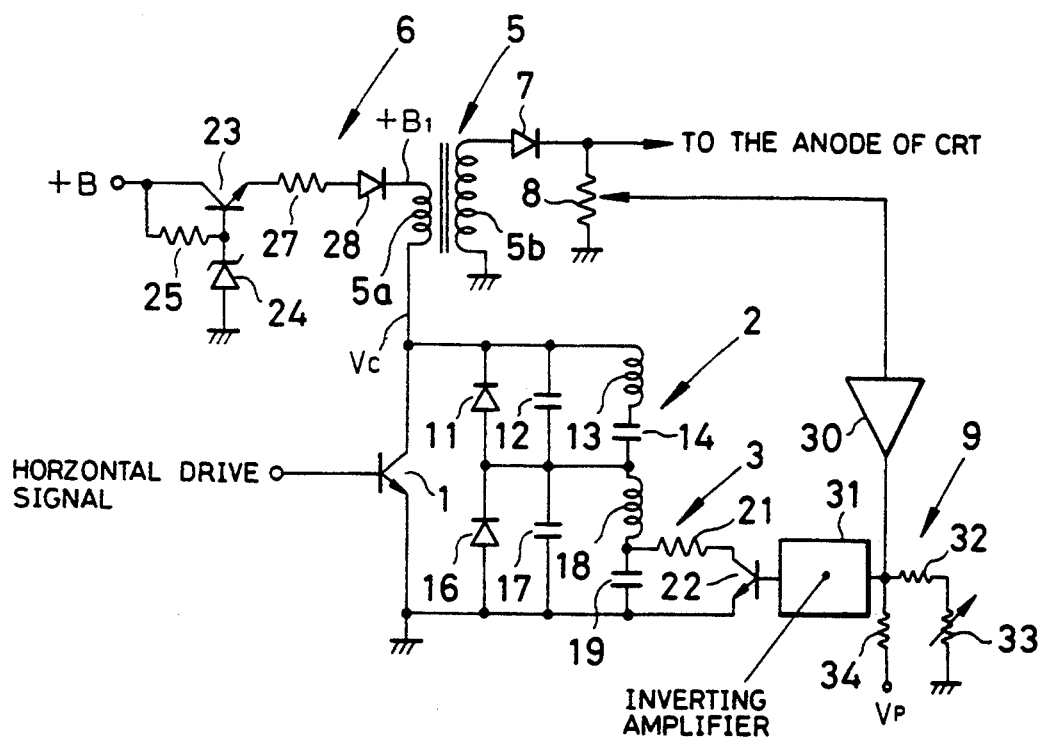
FIG. 1 is a circuit diagram showing a conventional deflection and high voltage circuit.
Figure 2:
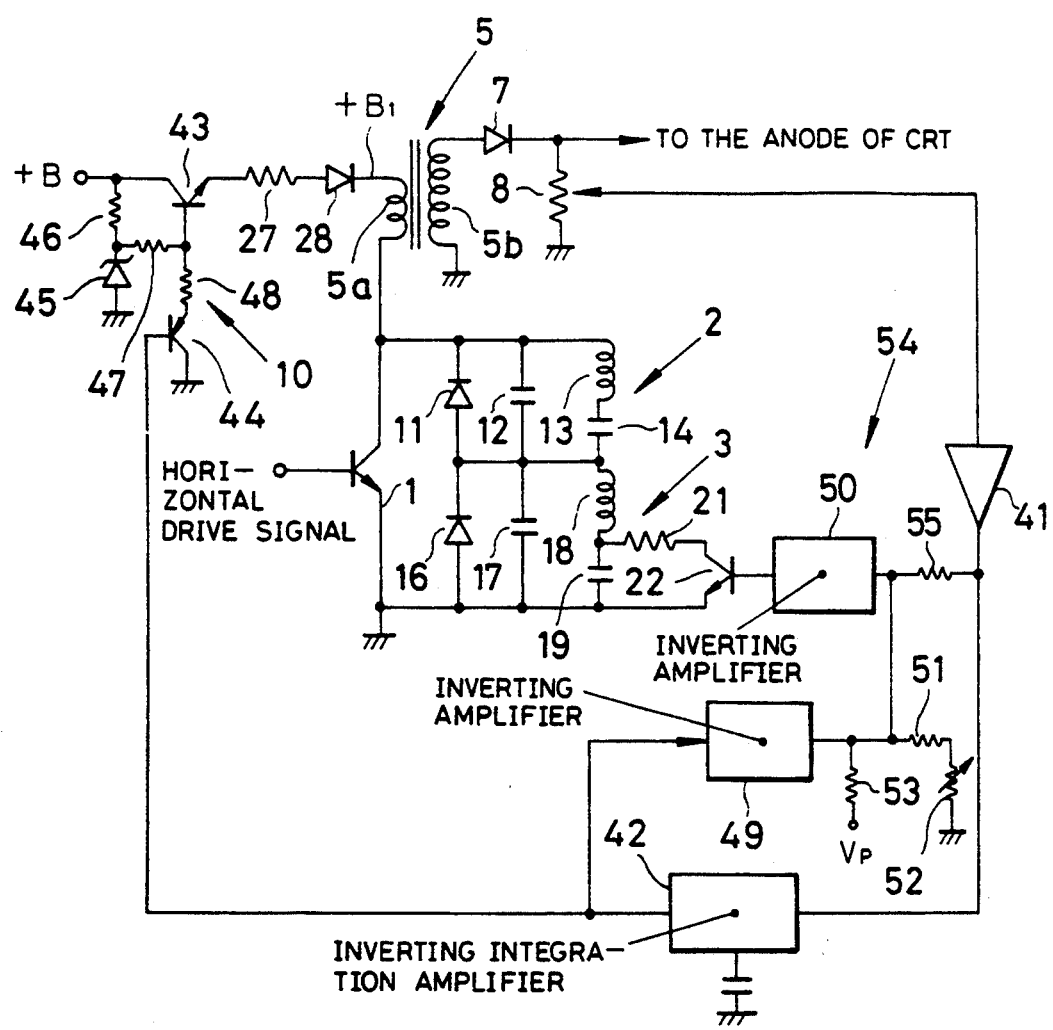
FIG. 2 is a circuit diagram showing an embodiment of the deflection and high voltage circuit according to the present invention.

In FIG. 2, portions and elements the same as those in the circuit illustrated in FIG. 1 are denoted by using the same reference numerals. As shown in this figure, an inverting integrating circuit 42 having a time constant is connected, via a buffer amplifier 41, to a voltage divided output of the bleeder resistor 8. The gain of the buffer amplifier 41 is made equal to 1, and its output is also connected, via a resistor 55, to an inverting amplifier 50. In this embodiment, instead of the voltage supply circuit 6, a voltage supply circuit 10 constituted by transistors 43 and 44, a Zener diode 45, and resistors 46 through 48, is provided. The voltage supply circuit 10 is also of the series type as in the case of the voltage supply circuit 6, but has a slightly different construction. Specifically, the power voltage +B is supplied to the collector of the transistor 43, and its emitter, functioning as an output terminal, is connected to a resistor 27. The resistors 46 and 47 are connected across the collector and the base of the transistor 43. The Zener diode 45 is connected to a junction between the resistors 46 and 47. To the base of the transistor 43, the emitter of the transistor 44 is connected via the resistor 48. The collector of the transistor 44 is grounded, and the output signal of the inverting amplifier 42 is supplied to the base of the transistor 44.

To the output terminal of the inverting amplifier 42, there is connected a series circuit of an inverting amplifier 49 and an inverting amplifier 50 whose output terminal is in turn connected to the base of the transistor 22. To the line connecting the inverting amplifiers 49 and 50, there is connected, via a resistor 51, a variable resistor 52 for the adjustment of the horizontal size. For the compensation of the pincushion distortion of the CRT, the parabolic voltage Vp repeating every field period is also connected to this line via a resistor 53.

Since the other portions of the circuit are the same as those shown in FIG. 1, the explanation thereof will not be repeated. Each of the inverting amplifiers 42, 49, 50 in the above circuit may be provided as an inverting amplifier made of a differential amplifier. In the case of such a configuration, a reference voltage is applied to the non-inverting input terminal of the differential amplifier. Furthermore, the inverting amplifier 42 is provided with a time constant circuit for smoothing a steep change in the input signal, so that an output voltage corresponding to the difference between the above-mentioned reference voltage and the output voltage of the buffer amplifier 41 is produced.

In the above circuit construction, the divided voltage of the anode voltage, produced by the bleeder resistor 8, is supplied to the inverting amplifier 50 via the buffer amplifier 41, so that the signal through these elements performs the same operation as that of the conventional circuit shown in FIG. 1. The voltage through the buffer amplifier 41 is also supplied to the inverting amplifier 42 by which the voltage corresponding to the difference between the divided voltage and the above-mentioned reference voltage is produced. This voltage is supplied to the base of the transistor 44 of the voltage supply circuit 10. In the voltage supply circuit 10, when the transistor 44 is off, a voltage determined by the zener voltage of the Zener diode 45 is applied to the base of the transistor 43, so that a voltage substantially equal to the base potential is produced. When, on the other hand, the voltage from the inverting amplifier 42 is applied to the base of the transistor 44, the transistor 44 is made active so that the Zener voltage of the Zener diode 45 is divided by the resistors 47 and 48 and the resistance across the collector and emitter of the transistor 44. The divided voltage is supplied to the base of the transistor 43.

With the circuit described above, when the luminance signal level goes up to reduce the anode voltage, it causes a reduction in the output voltage of the bleeder resistor 8. In response to this voltage drop, the output voltage of the inverting amplifier 42 goes up, to raise the voltage across the collector and emitter of the transistor 44. As a result, the base potential of the transistor 43 goes up, to raise the output voltage of the power supply circuit 10. Through these operations, the amount of energy accumulated in the deflection winding and the dummy winding 18 is increased. When the transistor 1 is off, the energy accumulated in the deflection winding 13 and the dummy winding 18 flows to charge the resonance capacitors 12 and 17, so that the collector voltage Vc of the transistor 1 is raised. In this way, the voltage applied to the primary 5a of the flyback transformer 5 is raised, and the boosted high voltage produced by the secondary winding, i.e., the anode voltage is raised. When, on the other hand, the luminance signal level drops to raise the anode voltage, the output voltage of the bleeder resistor 8 goes up. In response to this rise of the voltage level, the output voltage of the inverting amplifier 42 goes down, to reduce the voltage across the collector and emitter of the transistor 44. As a result, the base potential of the transistor 43 drops, to lower the output voltage of the power supply circuit 10. Through these operations, the amount of the energy accumulated in the deflection winding 13 and the dummy winding 18 is reduced. When the transistor 1 is off, the energy accumulated in the deflection winding 13 and the dummy winding 18 flows to charge the resonance capacitors 12 and 17, and the collector voltage Vc of the transistor 1 in this case is lowered due to the reduced amount of the accumulated energy. As a result, the voltage applied to the primary 5a of the flyback transformer 5 goes down, and the anode voltage produced by the secondary winding is reduced. By the operation described above, the anode voltage produced by the circuit according to the present invention is maintained at a constant voltage irrespectively of the variation of the luminance signal level.

Since the inverting amplifier 42 has a time constant over several fields, its output signal changes gradually. With this feature, the H (horizontal) size is prevented from being expanded widely when images of high luminance level are continuously displayed over several fields.

The output signal of the inverting amplifier 42 is supplied to a horizontal amplitude correction circuit 54 including inverting amplifiers 49 and 50. The provision of this circuit is aimed to prevent the voltage V1 across the terminals of capacitor 14 from varying with the variation of the power voltage +B. For this purpose, the voltage V2 across the terminals of the capacitor 19 is varied by the same signal as that used for the control of the power voltage +B. Since the output signal of the bleeder resistor 8 is already inverted by the inverting amplifier 42, adjustment of the output signal level of the inverting amplifier 42 is performed in the horizontal amplitude correction circuit 54 by the inverting amplifiers 49 and 50 and the variable resistor 52 for the H size adjustment. Also, the parabolic voltage Vp is superimposed on the output signal of the inverting amplifier 49.

The output signal of the inverting amplifier 50 produced as described above is supplied to the base of the transistor 22 as a voltage after the H size correction as well as a bleeder output voltage for preventing the variation of the high voltage. With this provision, compensation of the distortion of the horizontal deflection current is performed in accordance with the variation of the anode voltage of the CRT. Although the output signal of the inverting amplifier 42 is supplied to the correction circuit 54 in the circuit described above, it is also possible to use the emitter voltage of the transistor 43 as the input signal of the horizontal amplitude correction circuit 54. Specifically, in such a case, the emitter of the transistor 43 is coupled to the input terminal of the inverting amplifier 49 through a resistor. With this structure, the horizontal amplitude correction circuit 54 is controlled by the output signal of the power supply modulation circuit itself, so that a control operation by which the variation of the DC voltage +B also is compensated for. In this way, the generation of the high voltage and the control of the picture size are performed in a very stable manner.

In the circuit described above, the output signal of the bleeder resistor 8 is supplied to the transistor 22 through the inverting amplifier 42 having a time constant, the output signal of the bleeder resistor 8 functions through its signal path the same as that in the conventional circuit for steep changes of the high voltage, and the signal through the inverting amplifier 42 is especially effective for gradual changes in the high voltage.

Figure 3:
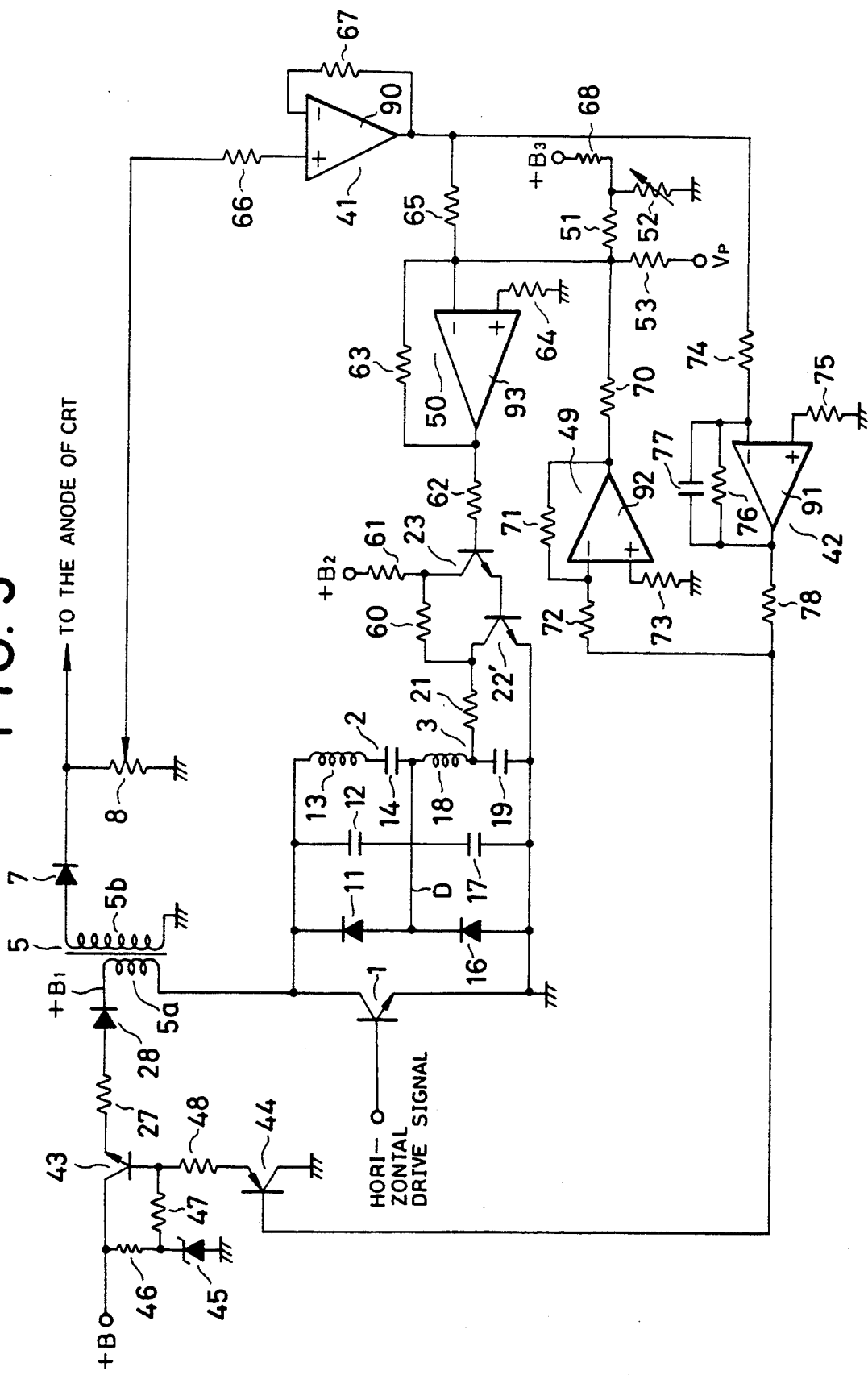
FIG. 3 is a circuit diagram showing another embodiment of the deflection and high voltage circuit according to the present invention.

Referring to FIG. 3, another embodiment of the deflection and high voltage circuit according to the present invention will be explained hereinafter. In FIG. 3, the buffer amplifier 41, inverting amplifiers 42, 49 and 50 shown in FIG. 2 are depicted as more concrete form including differential amplifiers 90, 91, 92 and 93, respectively. Since the operations of these circuits are the same as those shown in FIG. 2, detailed description thereof will not be repeated. In FIG. 3, the reference numerals 66 and 67 respectively represent an input resistor connected to the non-inverting input terminal of the differential amplifier 90 and a feedback resistor connected across the input and output terminals thereof. With respect to the differential amplifier 91 constituting the inverting amplifier 42, there are provided an input resistor 74 connected to the inverting input terminal thereof, a resistor 75 connecting the noninverting input terminal to ground, a resistor 76 connected across the inverting input terminal and output terminal thereof, an output resistor 78, and a capacitor 77 connected in parallel with the resistor 76. The integration time constant of the circuit is determined by the value the capacitor 77, and selected so that it lasts for a period of several fields, as mentioned before. The differential amplifiers 92 and 93 respectively constituting the inverting amplifiers 49 and 50 are provided with input resistors 72 and 65 connected to the inverting input terminal, resistors 73 and 64 connecting the noninverting input terminal to ground, feedback resistors 71 and 63 connected across the inverting input terminal and the output terminal, and output resistors 70 and 62, respectively.

In this embodiment, series connected transistors 22' and 23 are provided instead of the transistor 22 shown in FIG. 2. A power voltage +B2 is supplied to the collectors of the transistors 22' and 23 through resistors 60, 61, and resistor 61, respectively. The output signal of the differential amplifier 93 constituting the inverting amplifier 50 is connected to the base of the transistor 23 via the output resistor 62. Furthermore, a third power voltage +B3 is supplied, via a resistor 68, to a junction between the resistor 51 and the variable resistor 52. With this structure, the size of horizontal deflection by the horizontal deflection winding is determined depending on the power voltages +B2 and +B3, values of the resistor 51 and the variable resistor 52 for the adjustment of the horizontal size.

As specifically described in the foregoing, the deflection and high voltage circuit according to the present invention is configured to control the output voltage level of the voltage supply means in response to the change in the anode voltage of CRT, so that the anode voltage of CRT can be maintained constant. Furthermore, the circuit is devised to prevent the voltage V1 across the terminals of the S-curve correction capacitor connected to the horizontal deflection winding from being affected by the change in the voltage +B1. With this provision, the circuit functions to maintain the anode voltage at a constant level although changes in the luminance signal level affect the anode voltage level of CRT. Furthermore, with the further function of the circuit for smoothing the H size in gradual manner, proper luminance level is maintained over images displayed by the CRT on the whole.

What is claimed is:

1. An improved horizontal deflection and high-voltage circuit comprising:
   a source circuit for supplying a source DC voltage, said source circuit including a power voltage control element which controls a level of said source DC voltage in response to a control signal;
   a horizontal deflection circuit including a switching element responsive to a horizontal drive signal for supplying a current to a horizontal deflection winding in order to generate a scanning current developed by said source DC voltage;
   a flyback transformer coupled at a first terminal to said power voltage control element of said source circuit and at a second terminal to a trace capacitance and modulator capacitance connected in series to each other, for charging said series connected trace capacitance and said modulator capacitance from said source DC voltage, with load circuits magnetically coupled to said flyback transformer drawing load current from said source DC voltage;
   a high voltage circuit including a rectifier for rectifying the secondary winding voltage of said flyback transformer for supplying to an anode of a CRT to generate a high voltage;
   means for defining a horizontal size according to the variation in voltage of said high voltage, and
   a voltage control signal generator having a predetermined time constant characteristic, for producing said control signal of said source DC voltage, supplied to said source circuit, according to a variation in voltage of said high voltage, and for producing an additional control signal for said means for defining a horizontal size in response to said variation in voltage of said high voltage, variation rates of said control signal and said additional control signal are determined by said predetermined time constant characteristic.

2. The horizontal deflection and high voltage circuit as claimed in claim 1, wherein said voltage control circuit is adapted to receive a fluctuation of said high voltage and to supply the received signal through an amplifier having a predetermined time constant.

3. The horizontal deflection and high voltage circuit as claimed in claim 1, wherein a charge voltage of said modulation capacitance varies according to said high voltage.

4. The horizontal deflection and high voltage circuit as claimed in claim 1, wherein a charge voltage of said modulator capacitance varies according to said high voltage and an output signal of an amplifier receiving said high voltage, said amplifier having a predetermined time constant.

5. An improved horizontal deflection and high-voltage circuit, comprising:
   a source circuit for supplying a source DC voltage;
   a horizontal deflection circuit including a switching element responsive to a horizontal drive signal for supplying a current to a horizontal deflection winding in order to generate a scanning current developed by said source DC voltage;
   a flyback transformer coupled at a first terminal to said source DC voltage and at a second terminal to a trace capacitance and modulator capacitance connected in series to each other, for charging said series connected trace capacitance and said modulator capacitance from said source DC voltage, with load circuits magnetically coupled to said flyback transformer drawing load current from said source DC voltage;
   a high voltage circuit including a rectifier for rectifying the secondary winding voltage of said flyback transformer for supplying to an anode of a CRT to generate a high voltage;

a voltage control circuit for controlling said DC voltage level according to a variation in voltage of said high voltage;

means for defining a horizontal size according to the variation in voltage of said high voltage as said control of said DC voltage level; and a modulation control circuit for controlling said source DC voltage and a terminal voltage of said modulator capacitance, said modulation control circuit receiving, as a control signal, an output signal of an amplifier having a predetermined time constant and receiving an output signal of said high voltage circuit.

6. A deflection and high-voltage generating circuit for use with a cathode-ray tube having a deflection coil and an anode terminal, said circuit comprising:

a voltage supply or producing a DC voltage as an output voltage, said voltage supply including a power voltage control element which controls a level of said DC voltage in response to a control signal;

a horizontal deflection circuit, including a switching element which opens and closes in response to a horizontal drive signal, for supplying a drive current to said deflection coil of said cathode-ray tube on a basis of said output voltage of said voltage supply;

a flyback transformer having a primary winding to which a voltage at a terminal of said horizontal deflection coil is applied and a secondary winding;

a rectifier for rectifying a secondary voltage developing at said secondary winding of said flyback transformer and supplying a rectified voltage to said anode terminal of said cathode-ray tube;

means for defining a horizontal size according to said rectified voltage of said rectifier, and a voltage control signal generator having a predetermined time constant characteristic, for producing said control signal of said DC voltage level supplied to said power supply circuit according to a variation in voltage of said rectified voltage of said rectifier, and for producing an additional control signal for said means for defining a horizontal size in response to said variation in voltage of said rectified voltage of said rectifier, wherein variation rates of said control signal and said additional control signal are determined by said predetermined time constant characteristic.

7. The deflection and high-voltage generating circuit as claimed in claim 6, wherein said voltage controller includes a time constant circuit having a predetermined time constant to which said rectified voltage of said rectifier is supplied, and provides an output signal of said time constant circuit as a control voltage for controlling said output voltage of said voltage supply.

8. A deflection and high-voltage generating circuit for use with a cathode-ray tube having a deflection coil and an anode terminal, said circuit comprising:

a voltage supply for producing a DC voltage as an output voltage;

a horizontal deflection circuit, including a switching element which opens and closes in response to a horizontal drive signal, for supplying a drive current to said deflection coil of said cathode-ray tube on a basis of said output voltage of said voltage supply;

a flyback transformer having a primary winding to which a voltage at a terminal of said horizontal deflection coil is applied and a secondary winding;

a rectifier for rectifying a voltage developing at said secondary winding of said flyback transformer and supplying a rectified voltage to said anode terminal of said cathode-ray tube;

a voltage controller for controlling the level of said output voltage of said voltage supply in response to the level of said rectified voltage of said rectifier, said voltage controller including a time constant circuit having a predetermined time constant to which said rectified voltage of said rectifier is supplied, and provides an output signal of said time constant circuit as a control voltage for controlling said output voltage of said voltage supply;

means for defining a horizontal size according to said rectified voltage of said rectifier; and a horizontal amplitude correction circuit for maintaining a voltage to be fed to said deflection coil at a constant level irrespective of the control of said output voltage provided by said voltage supply in response to operation of said voltage controller.

9. The deflection and high-voltage generating circuit as claimed in claim 8, wherein said horizontal amplitude correction circuit comprises a secondary voltage supply for supplying a voltage based on said output voltage of said time constant circuit of said voltage controller, as said third control signal for controlling a voltage level at a terminal of said horizontal deflection coil.

10. A deflection and high voltage circuit comprising:

a power supply having a power transistor receiving a power source voltage and outputting said power source voltage as a DC voltage according to a base potential of said power transistor and a control transistor connected to the base of said power transistor for controlling said base potential;

a horizontal deflection circuit including a switching transistor which turns on and off in response to a horizontal drive signal, for supplying a current developed from said DC voltage to a horizontal deflection coil of a CRT connected to said switching transistor;

a flyback transformer having a primary winding with an end being connected to said power transistor of said power supply circuit and the other end being connected to a junction between said switching transistor and said horizontal deflection coil, and a secondary winding;

a high voltage circuit including a rectifier for rectifying a voltage developed across said secondary winding of said flyback transformer and supplying a produced high voltage to an anode of the CRT;

a voltage correction circuit comprising:

a first inverting amplifier receiving a control voltage according to the high voltage produced by the high voltage circuit via a bleeder resistor, and a variable load circuit receiving, as an input voltage, an output voltage of said inverting amplifier for varying a voltage across terminals of a modulator capacitor included in a parallel circuit connected in series with said horizontal deflection coil; and a voltage control circuit including a second inverting amplifier having a predetermined time constant and receiving a voltage from said bleeder resistor, and supplying an output voltage of said second amplifier to said power supply circuit as a control voltage of said control transistor.

11. The deflection and high voltage circuit as claimed in claim 10, further comprising:
a horizontal amplitude control circuit including a third inverting amplifier inverting an inverted output voltage of said second inverting amplifier of said voltage control circuit, applying a parabolic voltage which varies cyclically at a field period to said inverted output voltage of said third inverting amplifier, and adding a signal, which is obtained by adjusting the produced voltage in accordance with resistance of a horizontal size adjusting resistor, to an input voltage of said first inverting amplifier of said voltage correction circuit.

* * * * *